United States Patent
He et al.

(10) Patent No.: US 10,306,701 B2
(45) Date of Patent: May 28, 2019

(54) USER DISCOVERY METHOD, USER EQUIPMENT, AND PROXIMITY SERVICE FUNCTION ENTITY

(71) Applicant: HUAWEI TECHNOLOGIES CO., LTD., Shenzhen, Guangdong (CN)

(72) Inventors: Yue He, Beijing (CN); Hui Jin, Beijing (CN); Guowei Ouyang, Beijing (CN); Qiang Yi, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 60 days.

(21) Appl. No.: 15/483,078

(22) Filed: Apr. 10, 2017

(65) Prior Publication Data
US 2017/0215061 A1 Jul. 27, 2017

Related U.S. Application Data

(63) Continuation of application No. PCT/CN2014/088408, filed on Oct. 11, 2014.

(51) Int. Cl.
*H04H 20/71* (2008.01)
*H04W 76/40* (2018.01)
*H04L 29/06* (2006.01)
*H04W 12/02* (2009.01)
*H04W 8/00* (2009.01)
*H04W 24/08* (2009.01)
*H04W 48/10* (2009.01)
(Continued)

(52) U.S. Cl.
CPC .......... *H04W 76/40* (2018.02); *H04L 63/30* (2013.01); *H04W 8/005* (2013.01); *H04W 12/02* (2013.01); *H04W 24/08* (2013.01); *H04W 48/10* (2013.01); *H04W 72/005* (2013.01); *H04W 12/08* (2013.01)

(58) Field of Classification Search
CPC ..... H04W 72/04; H04W 88/08; H04W 76/00; H04W 4/06
See application file for complete search history.

(56) References Cited

U.S. PATENT DOCUMENTS

2013/0288668 A1 10/2013 Pragada et al.
2014/0112194 A1* 4/2014 Novlan ............... H04W 8/005
370/254
(Continued)

FOREIGN PATENT DOCUMENTS

CN 103731826 4/2014
CN 103906174 A 7/2014
CN 103916879 A 7/2014

OTHER PUBLICATIONS

International Search Report dated Jul. 17, 2015 in corresponding International Application No. PCT/CN2014/088408.
International Search Report, dated Jul. 17, 2015, in International Application No. PCT/CN2014/088408 (4 pp.).
Extended European Search Report dated Oct. 9, 2017 in corresponding European Patent Application No. 14903760.8.
(Continued)

*Primary Examiner* — Siren Wei
(74) *Attorney, Agent, or Firm* — Staas & Halsey LLP

(57) ABSTRACT

The present disclosure discloses a user discovery method, user equipment, and a proximity service function entity, and pertains to the field of mobile communications technologies. The method includes: receiving a first message sent by monitoring UE; sending a second message to monitored UE; receiving a third message sent by the monitored UE; allocating a broadcast code word to the monitored UE; and sending a fourth message to the monitoring UE.

16 Claims, 10 Drawing Sheets

(51) Int. Cl.
*H04W 72/00* (2009.01)
*H04W 12/08* (2009.01)

(56) References Cited

U.S. PATENT DOCUMENTS

| | | | |
|---|---|---|---|
| 2014/0130137 A1* | 5/2014 | Baek | H04W 12/08 |
| | | | 726/4 |
| 2014/0148201 A1 | 5/2014 | Kuo | |
| 2014/0162544 A1* | 6/2014 | Edge | H04W 8/005 |
| | | | 455/3.01 |
| 2014/0171013 A1 | 6/2014 | Varoglu et al. | |
| 2014/0301270 A1* | 10/2014 | Johnsson | H04W 72/042 |
| | | | 370/328 |
| 2015/0304262 A1 | 10/2015 | Guan et al. | |

OTHER PUBLICATIONS

Samsung: "Fix on the figure of monitoring request," 3GPP Draft; S2-143405 Monitoring Request REL12, $3^{rd}$ Generation Partnership Project, Mobile Competence Centre; 650, Route Des Lucioles; F-06921 Sophia-Antipolis Cedex, France, vol. SA WG2, no. Sapporo, Japan, Oct. 8, 2014, XP050891225.

Telecom Italia et al.: "Restricted ProSe Direct Discovery procedures," 3GPP Draft; $3^{rd}$ Generation Partnership Project, Mobile Competence Centre; 650, Route Des Lucioles; F-06921 Sophia-Antipolis Cedex, France, vol. SA WG2, no. Sapporo, Japan, Oct. 7, 2014, XP050890919.

Office Action, dated Mar. 4, 2019, in Chinese Application No. 201480081621.5 (5 pp.).

\* cited by examiner

USER DISCOVERY METHOD, USER EQUIPMENT, AND PROXIMITY SERVICE FUNCTION ENTITY

CROSS-REFERENCE TO RELATED APPLICATIONS

This application is a continuation of International Application No. PCT/CN2014/088408, filed on Oct. 11, 2014, the disclosure of which is hereby incorporated by reference in its entirety.

TECHNICAL FIELD

The present disclosure relates to the field of mobile communications technologies, and in particular, to a user discovery method, user equipment, and a proximity service function entity.

BACKGROUND

In a mobile network, mutual discovery among user equipments (UE) is a prerequisite for direct communication between UEs that are relatively close to each other.

Existing mutual discovery among UEs is usually implemented by using a monitoring procedure. Before monitoring other UE (referred to as monitored UE below), monitoring UE needs to first send a monitoring request to a proximity service function entity. The proximity service function entity forwards the monitoring request to an application server, and then the application server determines whether the monitored UE enables a discovery function (may also be referred to as a broadcast function). If the monitored UE enables the discovery function, the application server sends information about the monitored UE to the proximity service function entity. The proximity service function entity sends, to the monitoring UE, proximity service application code used by the monitored UE for broadcasting, so that the monitoring UE can use the proximity service application code to start to monitor the monitored UE.

In a process of implementing the present disclosure, the inventor finds that the related technology has at least the following problems:

If monitoring UE wants to discover monitored UE, the monitored UE needs to actively enable a discovery function (that is, active broadcasting). If the monitored UE does not enable the discovery function, the monitoring UE cannot discover the monitored UE.

SUMMARY

To resolve a problem in the prior art that monitoring UE cannot discover monitored UE if the monitored UE does not enable a discovery function, embodiments of the present disclosure provide a user discovery method, user equipment, and a proximity service function entity. The technical solutions are as follows:

According to one aspect, a user discovery method is provided, where the method includes:

receiving a first message sent by monitoring user equipment UE, where the first message is used to request to monitor monitored UE, the first message carries a command word, and the command word is used to apply for monitoring authorization;

sending a second message to the monitored UE, where the second message is used to apply to the monitored UE for monitoring authorization, and the second message carries an identity of the monitoring UE;

allocating a broadcast code word to the monitored UE;

receiving a third message sent by the monitored UE, where the third message is used to indicate whether the monitored UE agrees to be monitored by the monitoring UE, and the third message carries an identity of the monitored UE; and if the third message indicates that the monitored UE agrees to be monitored by the monitoring UE, sending a fourth message to the monitoring UE, where the fourth message carries the identity of the monitored UE and the broadcast code word of the monitored UE.

Specifically, the method further includes:

saving a monitoring-related context, where the monitoring-related context includes the identity of the monitored UE, the identity of the monitoring UE, the broadcast code word of the monitored UE, and a life cycle of the broadcast code word of the monitored UE.

Specifically, the method further includes:

when the life cycle of the broadcast code word of the monitored UE expires, allocating a new broadcast code word to the monitored UE; and sending the new broadcast code word to the monitoring UE according to the saved monitoring-related context.

Specifically, the method further includes:

receiving a fifth message sent by the monitoring UE, where the fifth message is used to prompt that the monitoring UE cannot monitor the monitored UE, and the fifth message carries the broadcast code word of the monitored UE or the identity of the monitored UE; and sending an alarm to the monitored UE according to the fifth message.

Specifically, the method further includes:

receiving a sixth message sent by the monitoring UE, where the sixth message is used by the monitoring UE to initiate a deactivation request, and the sixth message carries the broadcast code word of the monitored UE; and sending a seventh message to the monitored UE according to the sixth message and the monitoring-related context, where the seventh message is used to instruct the monitored UE to stop broadcasting.

Specifically, the method further includes:

receiving an eighth message sent by the monitored UE, where the eighth message is used by the monitored UE to initiate a deactivation request, and the eighth message carries the broadcast code word of the monitored UE; and sending a ninth message to the monitoring UE according to the eighth message and the monitoring-related context, where the ninth message is used to instruct the monitoring UE to stop monitoring the monitored UE.

According to another aspect, a user discovery method is provided, where the method includes:

sending a first message to a proximity service function entity, where the first message is used to request to monitor monitored UE, the first message carries a command word, and the command word is used to apply for monitoring authorization; and receiving a second message sent by the proximity service function entity, where the second message is sent after the proximity service function entity receives a third message sent by the monitored UE and when the third message indicates that the monitored UE agrees to be monitored by the monitoring UE, the third message carries an identity of the monitored UE, and the second message carries the identity of the monitored UE and a broadcast code word of the monitored UE.

Specifically, the method further includes:

sending a fourth message to the proximity service function entity, where the fourth message is used to prompt that the monitoring UE cannot monitor the monitored UE, and the fourth message carries the broadcast code word of the monitored UE or the identity of the monitored UE.

Specifically, the method further includes:

sending a fifth message to the proximity service function entity, where the fifth message is used to initiate a deactivation request, and the fifth message carries the broadcast code word of the monitored UE.

According to another aspect, a user discovery method is provided, where the method includes:

receiving a first message sent by a proximity service function entity, where the first message is sent after the proximity service function entity receives a second message sent by monitoring UE, the second message is used by the monitoring UE to request to monitor monitored UE, the second message carries a command word, the command word is used to apply for monitoring authorization, the first message is used to apply for monitoring authorization, and the first message carries an identity of the monitoring UE;

receiving a broadcast code word allocated by the proximity service function entity; and sending a third message to the proximity service function entity, where the third message is used to indicate whether monitoring by the monitoring UE is agreed, and the third message carries an identity of the monitored UE.

Specifically, the method further includes:

sending a fourth message to the proximity service function entity, where the fourth message is used to initiate a deactivation request, and the fourth message carries the broadcast code word of the monitored UE.

Specifically, the method further includes:

if the monitored UE agrees to be monitored by the monitoring UE and receives the broadcast code word, sending a broadcast message, where the broadcast message carries the broadcast code word of the monitored UE.

According to another aspect, a proximity service function entity is provided, where the proximity service function entity includes:

a first receiving module, configured to receive a first message sent by monitoring UE, where the first message is used to request to monitor monitored UE, the first message carries a command word, and the command word is used to apply for monitoring authorization;

a first sending module, configured to send a second message to the monitored UE, where the second message is used to apply to the monitored UE for monitoring authorization, and the second message carries an identity of the monitoring UE;

an allocation module, configured to allocate a broadcast code word to the monitored UE;

a second receiving module, configured to receive a third message sent by the monitored UE, where the third message is used to indicate whether the monitored UE agrees to be monitored by the monitoring UE, and the third message carries an identity of the monitored UE; and a second sending module, configured to: when the third message indicates that the monitored UE agrees to be monitored by the monitoring UE, send a fourth message to the monitoring UE, where the fourth message carries the identity of the monitored UE and the broadcast code word of the monitored UE.

Specifically, the proximity service function entity further includes:

a storage module, configured to store a monitoring-related context, where the monitoring-related context includes the identity of the monitored UE, the identity of the monitoring UE, the broadcast code word of the monitored UE, and a life cycle of the broadcast code word of the monitored UE.

Specifically, the proximity service function entity further includes:

a processing module, configured to: when the life cycle of the broadcast code word of the monitored UE expires, allocate a new broadcast code word to the monitored UE; and a third sending module, configured to send the new broadcast code word to the monitoring UE according to the stored monitoring-related context.

Specifically, the proximity service function entity further includes:

a third receiving module, configured to receive a fifth message sent by the monitoring UE, where the fifth message is used to prompt that the monitoring UE cannot monitor the monitored UE, and the fifth message carries the broadcast code word of the monitored UE or the identity of the monitored UE; and a fourth sending module, configured to send an alarm to the monitored UE according to the fifth message.

Specifically, the proximity service function entity further includes:

a fourth receiving module, configured to receive a sixth message sent by the monitoring UE, where the sixth message is used by the monitoring UE to initiate a deactivation request, and the sixth message carries the broadcast code word of the monitored UE; and a fifth sending module, configured to send a seventh message to the monitored UE according to the sixth message and the monitoring-related context, where the seventh message is used to instruct the monitored UE to stop broadcasting.

Specifically, the proximity service function entity further includes:

a fifth receiving module, configured to receive an eighth message sent by the monitored UE, where the eighth message is used by the monitored UE to initiate a deactivation request, and the eighth message carries the broadcast code word of the monitored UE; and a sixth sending module, configured to send a ninth message to the monitoring UE according to the eighth message and the monitoring-related context, where the ninth message is used to instruct the monitoring UE to stop monitoring the monitored UE.

According to another aspect, user equipment is provided, where the user equipment includes:

a first sending module, configured to send a first message to a proximity service function entity, where the first message is used to request to monitor monitored UE, the first message carries a command word, and the command word is used to apply for monitoring authorization; and a receiving module, configured to receive a second message sent by the proximity service function entity, where the second message is sent after the proximity service function entity receives a third message sent by the monitored UE and when the third message indicates that the monitored UE agrees to be monitored by the monitoring UE, the third message carries an identity of the monitored UE, and the second message carries the identity of the monitored UE and a broadcast code word of the monitored UE.

Specifically, the user equipment further includes:

a second sending module, configured to send a fourth message to the proximity service function entity, where the fourth message is used to prompt that the monitoring UE cannot monitor the monitored UE, and the fourth message carries the broadcast code word of the monitored UE or the identity of the monitored UE.

Specifically, the user equipment further includes:

a third sending module, configured to send a fifth message to the proximity service function entity, where the fifth message is used to initiate a deactivation request, and the fifth message carries the broadcast code word of the monitored UE.

According to another aspect, user equipment is provided, where the user equipment includes:

a first receiving module, configured to receive a first message sent by a proximity service function entity, where the first message is sent after the proximity service function entity receives a second message sent by monitoring UE, the second message is used by the monitoring UE to request to monitor the monitored UE, the second message carries a command word, the command word is used to apply for monitoring authorization, the first message is used to apply for monitoring authorization, and the first message carries an identity of the monitoring UE;

a first sending module, configured to send a third message to the proximity service function entity, where the third message is used to indicate whether monitoring by the monitoring UE is agreed, and the third message carries an identity of the monitored UE; and a second receiving module, configured to receive a broadcast code word allocated by the proximity service function entity.

Specifically, the user equipment further includes:

a second sending module, configured to send a fourth message to the proximity service function entity, where the fourth message is used to initiate a deactivation request, and the fourth message carries the broadcast code word of the monitored UE.

Specifically, the user equipment further includes:

a third sending module, configured to: when the monitored UE agrees to be monitored by the monitoring UE and receives the broadcast code word, send a broadcast message, where the broadcast message carries the broadcast code word of the monitored UE.

According to another aspect, a proximity service function entity is provided, where the proximity service function entity includes:

a processor, a memory, a bus, and a communications interface, where the memory is configured to store a computer executable instruction, the processor and the memory are connected by using the bus, and when the computer runs, the processor executes the computer executable instruction stored in the memory, so that the computer executes one of the user discovery methods described in the foregoing.

According to another aspect, user equipment is provided, where the user equipment includes:

a processor, a memory, a bus, and a communications interface, where the memory is configured to store a computer executable instruction, the processor and the memory are connected by using the bus, and when the computer runs, the processor executes the computer executable instruction stored in the memory, so that the computer executes one of the user discovery methods described in the foregoing.

According to another aspect, user equipment is provided, where the user equipment includes:

a processor, a memory, a bus, and a communications interface, where the memory is configured to store a computer executable instruction, the processor and the memory are connected by using the bus, and when the computer runs, the processor executes the computer executable instruction stored in the memory, so that the computer executes one of the user discovery methods described in the foregoing.

The technical solutions provided in the embodiments of the present disclosure bring the following beneficial effects:

A first message sent by monitoring UE is obtained, and a second message is sent to monitored UE, where the second message is used to apply to the monitored UE for monitoring authorization, so that the monitored UE can still learn that the monitoring UE sends a monitoring authorization application request to the monitored UE when broadcasting is not started, and further start to broadcast; then, a third message sent by the monitored UE is received; and if the third message indicates that a monitored user agrees to be monitored by a monitoring user, a fourth message is sent to the monitoring UE, where the fourth message carries a broadcast code word of the monitored UE, so that the monitoring UE can monitor the monitored UE according to the broadcast code word, thereby implementing that the monitoring user can still monitor and discover the monitored user when the monitored user does not actively broadcast.

BRIEF DESCRIPTION OF DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes the embodiments of the present disclosure in detail with reference to the accompanying drawings.

To facilitate understanding of the embodiments of the present disclosure, the following first briefly describes a proximity service and an application scenario of the proximity service. The so-called proximity service means that when two (or more) UEs are relatively close to each other, the two (or more) UEs can discover each other, and may directly exchange data without using a core network entity or exchange data by using only a base station. Mutual discovery among users is an important part of the proximity service.

In a process of the mutual discovery among users, one UE (referred to as monitored UE in the embodiments of the present disclosure) needs to broadcast and adds identity information of the UE to a broadcast message, for example, a user ID, and user code. After receiving the broadcast message, another UE (referred to as monitoring UE in the embodiments of the present disclosure) determines, according to the identity information in the broadcast message, whether the UE sending the broadcast message is UE the another UE wants to discover. If the UE sending the broadcast message is the UE the monitoring UE wants to discover, the monitoring UE reports information about the monitored UE to an application server. Then, the application server sends information (for example, application information such as a user name, and a personalized signature) about the monitoring UE to the monitored UE, thereby implementing the mutual discovery among users.

Broadcasting of the monitored UE may be active broadcasting, that is, a monitored user actively enables a broadcast function, or may be passive broadcasting, that is, the monitoring UE applies to the monitored UE for monitoring, and the monitored UE broadcasts when the monitored user allows monitoring by the monitoring UE. A focus of the embodiments of the present disclosure lies in that the passive broadcasting of the monitored UE is applicable to a scenario in which a user of the monitored UE does not enable the broadcast function due to a reason, for example, the user does not know how to operate or forgets to enable the broadcast function, and the monitoring UE needs to monitor the monitored UE, for example, a scenario in which parents hope to monitor a child (the child may not know how to enable the broadcast function due to a small age) at any time, a scenario in which a guide monitors a tourist in a tour (the tourist may forget to enable the broadcast function due to separation), or a scenario in which friends do not want to get separated during shopping (during shopping, a friend forgets to enable the broadcast function because they do not expect to get separated).

Embodiment 1

Figure 1:
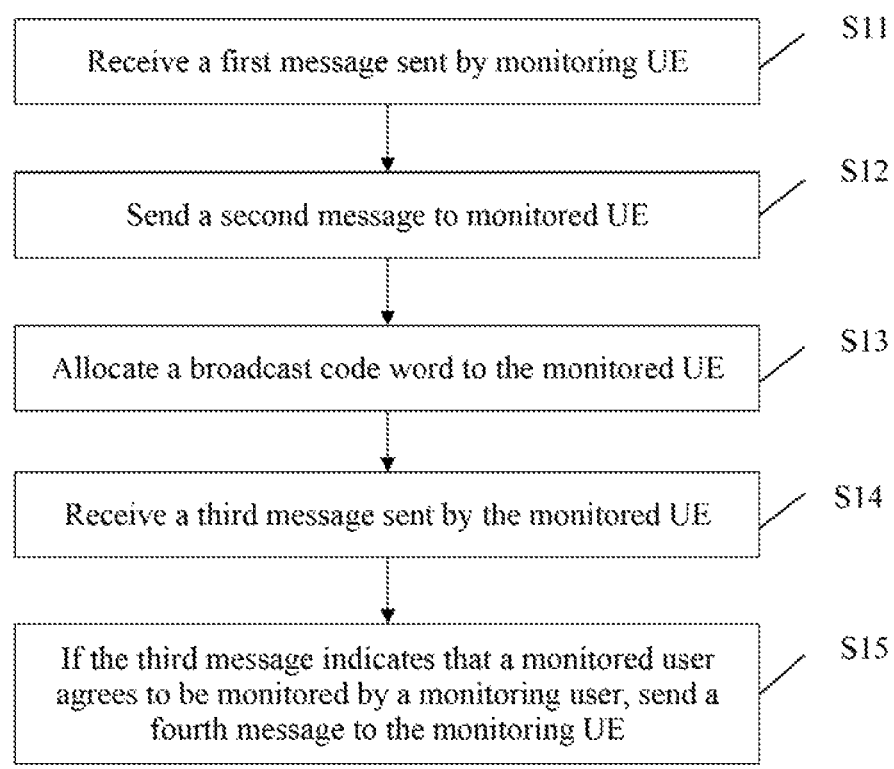
FIG. 1 is a flowchart of a user discovery method according to Embodiment 1 of the present disclosure.

This embodiment of the present disclosure provides a user discovery method. The method may be executed by a core network entity, for example, a proximity service function entity in a core network. The proximity service function entity may be individually disposed. Referring to FIG. 1, the method includes the following steps.

Step S11: Receive a first message sent by monitoring UE, where the first message is used to request to monitor monitored UE, the first message carries a command word, and the command word is used to apply for monitoring authorization.

Specifically, the first message may be implemented by adding a monitoring command word (that is, the command word in step S11) to a restricted discovery request. In actual application, the monitoring command word may be supervising. The monitoring command word may be used to enable the proximity service function entity to trigger an authentication procedure, and trigger the monitored UE to broadcast.

It should be noted that, in this embodiment of the present disclosure, the monitoring UE (in actual application, may be referred to as Monitoring UE) refers to UE used by a monitoring user. Likewise, the monitored UE (in actual application, may be referred to as Announcing UE) refers to UE used by a monitored user.

Step S12: Send a second message to the monitored UE, where the second message is used to apply to the monitored UE for monitoring authorization, and the second message carries an identity of the monitoring UE.

In this embodiment, the second message may further carry a command word.

In this embodiment, the monitored UE learns, according to the received second message, that the UE sends a monitoring request to the monitored UE. The monitored UE may prompt, according to the second message, the user whether to accept monitoring. The user may choose, by using a user command, whether to accept the monitoring. After receiving the user command, the monitored UE sends corresponding information according to the received user command.

Specifically, an identity of the monitoring UE may be a fixed ID (for example, a subscriber identity module (SIM) card ID) of the user, or may be a temporary ID allocated to the user. An identity in this embodiment is a temporary ID. The temporary ID may prevent an application server from learning mobile network identity information of UE, and ensure security of the mobile network identity information of a user.

If the identity is a temporary ID, the temporary ID is allocated by the proximity service function entity to the UE. The temporary ID may include a public land mobile network (PLMN) ID, and is used to uniquely determine the UE in an evolved packet core (EPC) network.

Step S13: Allocate a broadcast code word to the monitored UE.

The broadcast code word of the monitored UE refers to a code word that is to be added to a broadcast message by the monitored UE.

It should be noted that the proximity service function entity may allocate the broadcast code word to the monitored UE after the monitored UE agrees to be monitored by the monitoring UE, or the proximity service function entity may allocate the broadcast code word to the monitored UE when the proximity service function entity sends the second message to the monitored UE.

Step S14: Receive a third message sent by the monitored UE, where the third message is used to indicate whether the monitored UE agrees to be monitored by the monitoring UE, and the third message carries an identity of the monitored UE.

If the third message indicates that the monitored UE agrees to be monitored by the monitoring UE, step S15 is performed. If the third message indicates that the monitored UE does not agree to be monitored by the monitoring UE, a response message is sent to the monitoring UE. The response message is used to indicate that the monitored UE does not agree to be monitored.

Step S15: Send a fourth message to the monitoring UE, where the fourth message carries the identity of the monitored UE and the broadcast code word of the monitored UE.

Specifically, after receiving the broadcast code word of the monitored UE, the monitoring UE starts to monitor the monitored UE.

In this embodiment of the present disclosure, a first message sent by monitoring UE is obtained, and a second message is sent to monitored UE, where the second message is used to apply to the monitored UE for monitoring authorization, so that the monitored UE can still learn that the monitoring UE sends a monitoring authorization application request to the monitored UE when broadcasting is not started, and further start to broadcast; then, a third message sent by the monitored UE is received, and if the third message indicates that a monitored user agrees to be monitored by a monitoring user, a fourth message is sent to the monitoring UE, where the fourth message carries a broadcast code word of the monitored UE, so that the monitoring UE can monitor the monitored UE according to the broadcast code word, thereby implementing that the monitoring user can still monitor and discover the monitored user when the monitored user does not actively broadcast.

Embodiment 2

Figure 2:
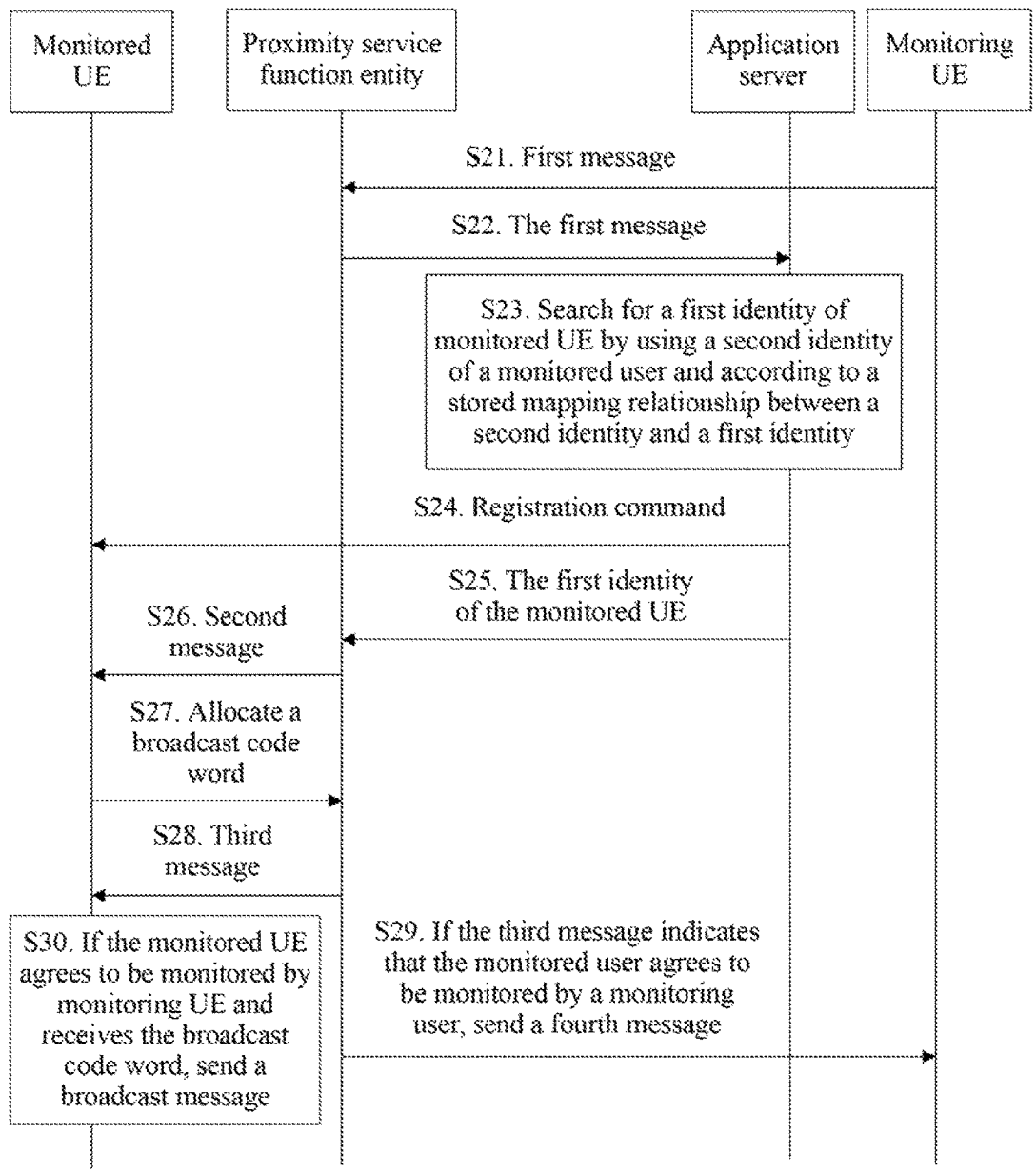
FIG. 2 is a diagram of interaction of a user discovery method according to Embodiment 2 of the present disclosure.

This embodiment of the present disclosure provides a user discovery method. In this embodiment, an identity of UE is a UE ID (referred to as a first identity of the UE in the following) allocated by a proximity service function entity to the UE. In addition, an application server allocates a user ID (referred to as a second identity of the UE in the following) to an application user. Referring to FIG. 2, the method includes the following steps.

Step S21: Monitoring UE sends a first message to the proximity service function entity, where the first message is used to request to monitor monitored UE, the first message carries a command word, and the command word is used to apply for monitoring authorization.

Specifically, the first message may be implemented by adding a monitoring command word (that is, the command word in step S21) to a restricted discovery request. In actual application, the monitoring command word may be supervising. The monitoring command word may be used to enable the proximity service function entity to trigger an authentication procedure, and trigger the monitored UE to broadcast.

Optionally, the monitoring UE may further send monitoring-related information such as monitoring duration to the proximity service function entity according to a user command.

It should be noted that, in this embodiment of the present disclosure, the monitoring UE refers to UE used by a monitoring user.

Optionally, the first message may further include a second identity of the monitoring UE and a second identity of the monitored UE.

Specifically, the application server allocates a second identity to UE. The second identity may be a fixed ID of a user (for example, an instant messaging application account of the user), or may be a temporary ID (for example, a temporary ID corresponding to an instant messaging application account of a user) allocated according to a fixed ID of the user. A second identity in this embodiment is a temporary ID. Therefore, this may prevent a core network entity from learning application layer information of a user, for example, account information and a signature, and security of the application layer information of the user is ensured. In this embodiment, that the second identity is a temporary ID is used for description, and is not emphasized in the following.

In actual application, the monitoring UE may designate a monitoring object (that is, the monitored UE) in the following manners.

1. After the user logs in to the application server by using a client on the UE, the application server allocates second identities to the user and a friend of the user according to prestored information about the friend of the user, and configures these second identities in the UE used by the user.

2. The first message sent by the monitoring UE to the proximity service function entity carries both the second identity of the monitoring UE and the second identity of the monitored UE. Specifically, the monitoring UE receives a monitoring command sent by the monitoring user, where the monitoring command includes a user ID (for example, an instant messaging application account of a user) of the monitoring object (that is, the monitored user), determines the second identity of the monitoring object according to the user ID of the monitoring object in the monitoring command, determines the second identity of the monitored user according to a user ID of a monitored object in the monitoring command, and sends the second identity of the monitoring object and the second identity of the monitored user to the proximity service function entity.

The foregoing step 2 may be further implemented in the following manner.

The first message sent by the monitoring UE to the proximity service function entity includes only the second identity of the monitoring user, and does not include the second identity of the monitored user. In this case, the monitoring user sends a monitoring command to the monitoring UE. The monitoring command includes a user ID (for example, an instant messaging application account of the user) of the monitoring object (that is, the monitored user). After receiving the monitoring command, the monitoring UE sends the user ID of the monitored user to the application server by using the proximity service function entity. The application server stores a correspondence between the second identity of the monitoring user and the second identity of the monitored user.

Step S22: The proximity service function entity sends, to the application server, the first message sent by the monitoring UE.

In specific implementation, the proximity service function entity is usually set according to an operator. UEs belonging to different operators are usually managed by proximity service function entities of respective operators. The proximity service function entities allocate UE IDs and proximity service application service code, and manage monitoring-related contexts (described in detail in the following) of the UEs. In this embodiment, a case in which the monitoring UE and the monitored UE are managed by proximity service function entities of a same operator is referred to as non-roaming. A case in which the monitoring UE and the monitored UE are managed by proximity service function entities of different operators is referred to as roaming.

Step S23: The application server searches for a first identity of the monitored UE by using a second identity of a monitored user and according to a stored mapping relationship between a second identity and a first identity.

If the application server does not find the first identity of the monitored UE, step S24 is performed. If the application server finds the first identity of the monitored UE, step S25 is performed.

It should be noted that, in this embodiment of the present disclosure, the monitored UE refers to UE used by the monitored user.

Likewise, the first identity of the UE may be a fixed ID (for example, a subscriber identity module (SIM) card ID) of the user, or may be a temporary ID allocated to the user. In this embodiment, these first identities are temporary IDs. The temporary ID may prevent the application server from learning mobile network identity information of UE, and ensure security of the mobile network identity information of a user.

If these first identities are temporary IDs, these temporary IDs are allocated by the proximity service function entity to UEs. These temporary IDs may include a public land mobile network (PLMN) ID, and are used to uniquely determine the UEs in an evolved packet core (EPC) network.

In actual application, the mapping relationship between the second identity and the first identity is prestored on the application server (for example, obtained by using the following registration procedure). As described in the foregoing, the second identity of the monitored user may be sent to the application server by being added to the foregoing first message, or may be sent to the application server in advance.

In this embodiment, that the first identity is a temporary ID is used for description, and is not emphasized in the following.

Step S24: The application server sends a registration command to the monitored UE, where the registration command is used to instruct the monitored UE to initiate a registration procedure.

It is easy to learn that the UE may actively initiate the registration procedure.

Figure 3:
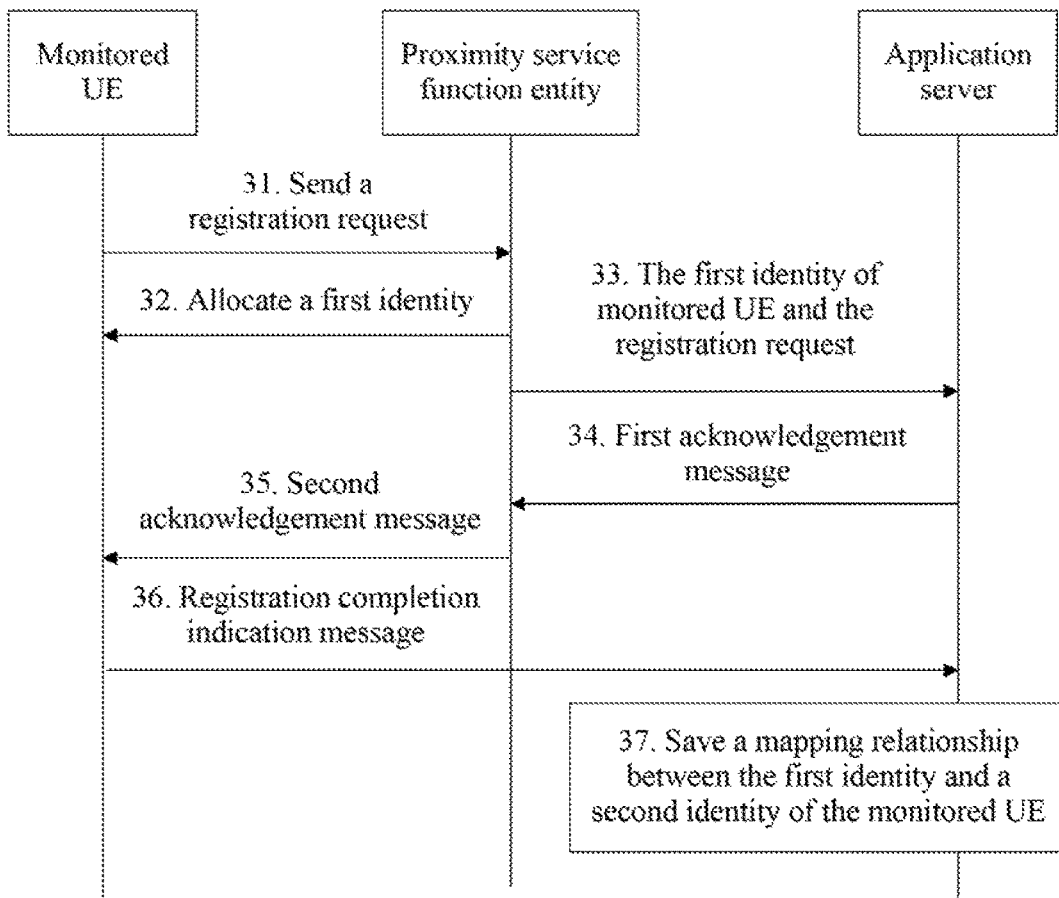
FIG. 3 is a flowchart of registration according to Embodiment 2 of the present disclosure.

Specifically, referring to FIG. 3, the registration procedure is as follows:

31. The monitored UE sends a registration request to the proximity service function entity according to the registration command, where the registration request includes the second identity of the monitored user.

The registration request may be a restricted discovery registration (Restricted discovery Registration) request.

32. The proximity service function entity allocates the first identity to the monitored UE.

33. The proximity service function entity sends the first identity of the monitored UE and the registration request to the application server.

34. The application server feeds back a first acknowledgement message to the proximity service function entity.

35. After receiving the first acknowledgement message, the proximity service function entity feeds back a second acknowledgement message to the monitored UE, where the second acknowledgement message includes the first identity of the monitored UE.

36. The monitored UE sends a registration completion indication message to the application server.

37. After receiving the registration completion indication message, the application server saves a mapping relationship between the first identity and the second identity of the monitored UE.

It may be understood that, when the application server sends the registration command to the monitored UE, the monitored UE may output a user option, so that the user chooses to initiate or not to initiate the registration procedure.

After the monitored UE completes the registration procedure, step S25 may continue to be performed.

Step S25: The application server feeds back the first identity of the monitored UE to the proximity service function entity.

In actual application, the application server may further send the monitoring duration to the proximity service function entity.

Step S26: The proximity service function entity sends a second message to the monitored UE, where the second message is used to apply to the monitored UE for monitoring authorization, and the second message carries the first identity of the monitored UE.

In this embodiment, the second message may further carry a command word.

In this embodiment, the monitored UE learns, according to the received second message, that the UE sends a monitoring request to the monitored UE. The monitored UE may prompt, according to the second message, the user whether to accept monitoring. The user may choose, by using a user command, whether to accept the monitoring. After receiving the user command, the monitored UE sends corresponding information according to the received user command.

In actual application, the proximity service function entity may further send the monitoring duration to the monitored UE.

When the monitoring UE and the monitored UE are in a non-roaming scenario, the second message is directly sent to the monitored UE by a proximity service function entity shared by the monitoring UE and the monitored UE. When the monitoring UE and the monitored UE are in a roaming scenario, the second message is forwarded to the monitored UE by a proximity service function entity of an operator to which the monitored UE belongs.

Step S27: The proximity service function entity allocates a broadcast code word to the monitored UE.

The broadcast code word of the monitored UE refers to a code word that is to be added to a broadcast message by the monitored UE.

It should be noted that the proximity service function entity may allocate the broadcast code word to the monitored UE after the monitored UE agrees to be monitored by the monitoring UE, or the proximity service function entity may allocate the broadcast code word to the monitored UE when the proximity service function entity sends the second message to the monitored UE.

Step S28: The monitored UE sends a third message to the proximity service function entity, where the third message is used to indicate whether the monitored UE agrees to be monitored by the monitoring UE, and the third message carries the first identity of the monitored UE.

If the third message indicates that the monitored UE agrees to be monitored by the monitoring UE, step S29 is performed. If the third message indicates that the monitored UE does not agree to be monitored by the monitoring UE, a response message is sent to the monitoring UE. The response message is used to indicate that the monitored UE does not agree to be monitored.

Likewise, when the monitoring UE and the monitored UE are in the non-roaming scenario, the third message is directly sent to the monitoring UE by the proximity service function entity shared by the monitoring UE and the monitored UE. When the monitoring UE and the monitored UE are in the roaming scenario, the monitored UE sends the third message to the proximity service function entity of the operator to which the monitored UE belongs, and a proximity service function entity of an operator to which the monitoring UE belongs forwards the third message to the monitoring UE.

Step S29: The proximity service function entity sends a fourth message to the monitoring UE, where the fourth message carries the broadcast code word of the monitored UE.

Specifically, after receiving the broadcast code word of the monitored UE, the monitoring UE starts to monitor the monitored UE.

In this embodiment, the broadcast code word is used to uniquely identify UE on an air interface.

Likewise, when the monitoring UE and the monitored UE are in the non-roaming scenario, the fourth message is directly sent to the monitoring UE by the proximity service function entity shared by the monitoring UE and the monitored UE. When the monitoring UE and the monitored UE are in the roaming scenario, the fourth message is sent to the monitoring UE by the proximity service function entity of the operator to which the monitoring UE belongs.

Step S30: If the monitored UE agrees to be monitored by the monitoring UE and receives the broadcast code word, a broadcast message is sent, where the broadcast message carries the broadcast code word of the monitored UE.

Specifically, after agreeing to be monitored and receiving the broadcast code word, the monitored UE starts to broadcast, and sends the broadcast message that carries the broadcast code word.

In actual application, the proximity service function entity saves a monitoring-related context. The monitoring-related context includes the first identity of the monitored UE, a first identity of the monitoring UE, the broadcast code word of the monitored UE, and a life cycle of the broadcast code word of the monitored UE.

Specifically, the monitoring-related context may further include information such as the monitoring duration.

Optionally, the method provided in this embodiment may further include:

when the life cycle of the broadcast code word of the monitored UE expires, the proximity service function entity allocates a new broadcast code word to the monitored UE; and the proximity service function entity sends, according to the saved monitoring-related context, the new broadcast code word to the monitoring UE corresponding to the monitored UE.

Figure 4:
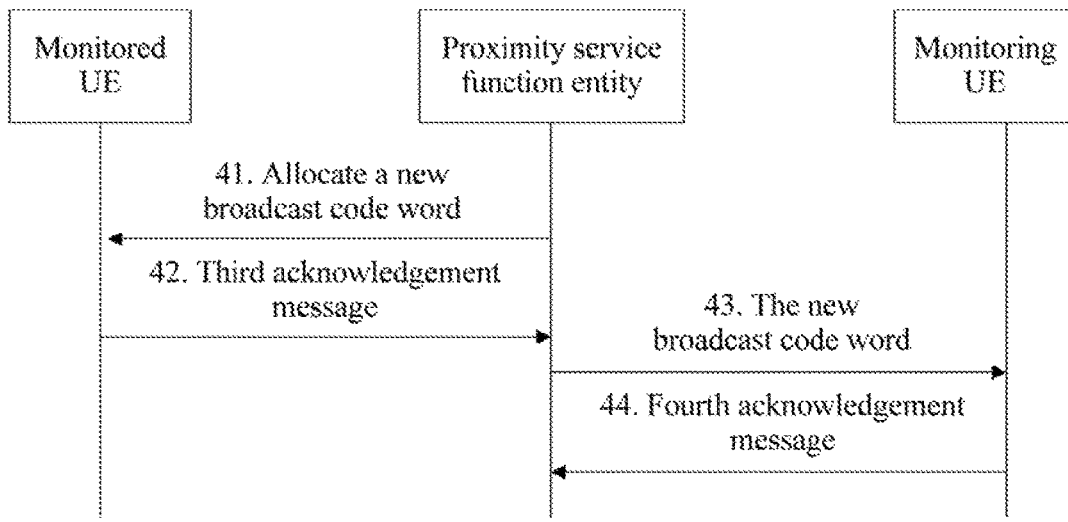
FIG. 4 is a flowchart of reallocating a broadcast code word according to Embodiment 2 of the present disclosure.

In this embodiment, because the broadcast code word has the life cycle, and in a monitoring process, if the life cycle of the broadcast code word ends, a procedure of reallocating a broadcast code word is triggered. Referring to FIG. 4, the reallocation procedure is as follows:

41. The proximity service function entity allocates a new broadcast code word to the monitored UE.

42. The monitored UE to which the new broadcast code word is allocated feeds back a third acknowledgement message to the proximity service function entity.

43. The proximity service function entity sends, according to the saved monitoring-related context, the new broadcast code word to the monitoring UE corresponding to the monitored UE.

44. The monitoring UE feeds back a fourth acknowledgement message to the proximity service function entity.

A case in which monitoring cannot be performed due to expiration or invalidity of the broadcast code word may be avoided by using the procedure of reallocating a broadcast code word.

Optionally, in this embodiment, if the monitoring UE cannot monitor specific monitored UE, the method in this embodiment may further include:

the proximity service function entity receives a fifth message sent by the monitoring UE, where the fifth message is used to prompt that the monitoring UE cannot monitor the monitored UE, and the fifth message carries the broadcast code word of the monitored UE or the first identity of the monitored UE; and the proximity service function entity sends an alarm to the monitored UE according to the fifth message.

Figure 5:
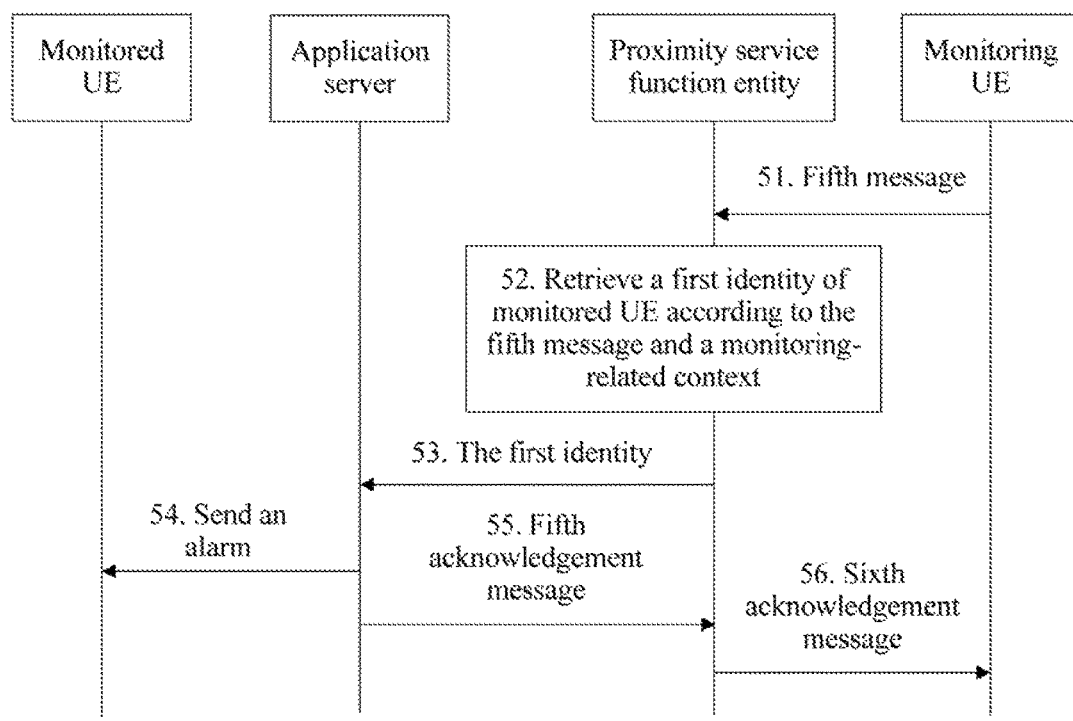
FIG. 5 is a flowchart of an alarm according to Embodiment 2 of the present disclosure.

In this embodiment, if the monitoring UE finds that the monitored UE cannot be monitored, an alarm procedure is triggered. Referring to FIG. 5, the alarm procedure is as follows:

51. The monitoring UE sends a fifth message to the proximity service function entity, where the fifth message is used to prompt that the monitoring UE cannot monitor the monitored UE, and the fifth message carries the broadcast code word of the monitored UE.

52. The proximity service function entity retrieves the first identity of the monitored UE according to the fifth message and the monitoring-related context.

53. The proximity service function entity sends the first identity to the application server.

54. The application server sends an alarm to the monitored UE.

55. The application server feeds back a fifth acknowledgement message to the proximity service function entity.

56. The proximity service function entity feeds back a sixth acknowledgement message to the monitoring UE.

In another implementation manner of this embodiment, the fifth message may carry the first identity of the monitored UE, and step 52 in the alarm procedure may be omitted.

Optionally, in this embodiment, in a monitoring process, if the monitoring user does not want to perform monitoring, the method in this embodiment may further include:

the proximity service function entity receives a sixth message sent by the monitoring UE, where the sixth message is used by the monitoring UE to initiate a deactivation request, and the sixth message carries the broadcast code word of the monitored UE; and the proximity service function entity sends a seventh message to the monitored UE according to the sixth message and the monitoring-related context, where the seventh message is used to instruct the monitored UE to stop broadcasting.

Figure 6:
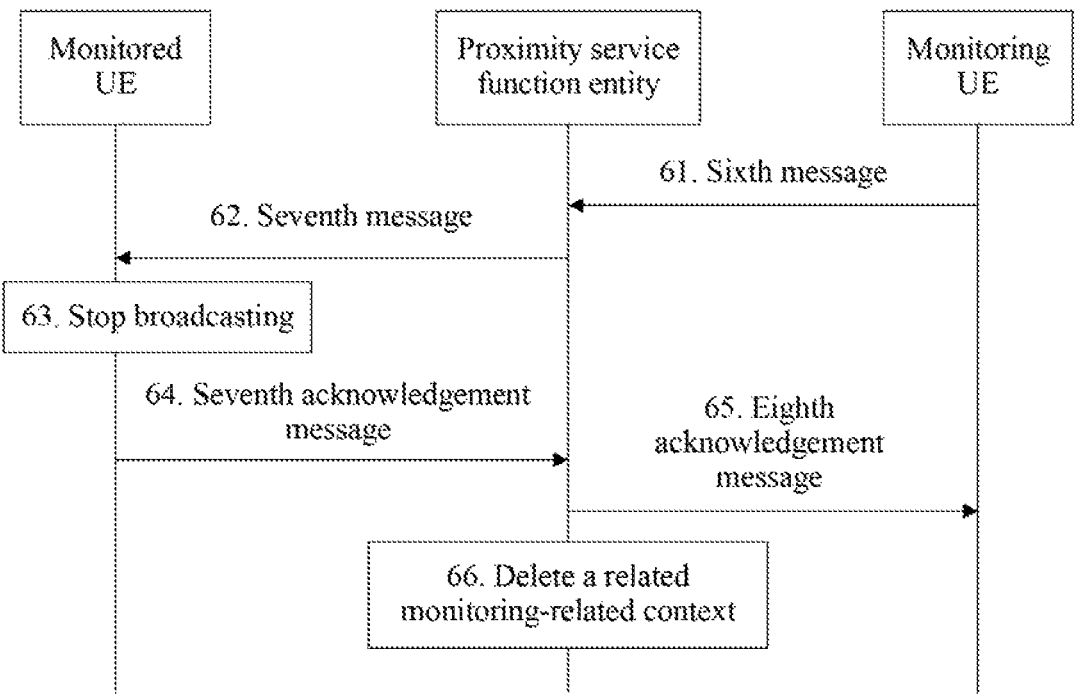
FIG. 6 is a flowchart of deactivation according to Embodiment 2 of the present disclosure.

In this embodiment, in the monitoring process, if the monitoring user does not want to perform monitoring, the monitoring user may initiate a deactivation procedure. Referring to FIG. 6, the deactivation procedure includes:

61. The monitoring UE sends a sixth message to the proximity service function entity, where the sixth message is used by the monitoring UE to initiate a deactivation request, and the sixth message carries the broadcast code word of the monitored UE.

62. The proximity service function entity sends a seventh message to the monitored UE according to the sixth message and the monitoring-related context, where the seventh message is used to instruct the monitored UE to stop broadcasting.

63. The monitored UE stops broadcasting according to the seventh message.

64. The monitored UE feeds back a seventh acknowledgement message to the proximity service function entity.

65. The proximity service function entity feeds back an eighth acknowledgement message to the monitoring UE.

66. The proximity service function entity deletes the related monitoring-related context.

Optionally, in this embodiment, in a monitoring process, if the monitored user does not want to be monitored, the method in this embodiment may further include:

the proximity service function entity receives an eighth message sent by the monitored UE, where the eighth message is used by the monitored UE to initiate a deactivation request, and the eighth message carries the broadcast code word of the monitored UE; and the proximity service function entity sends a ninth message to the monitoring UE according to the eighth message and the monitoring-related context, where the ninth message is used to instruct the monitoring UE to stop monitoring the monitored UE.

Figure 7:
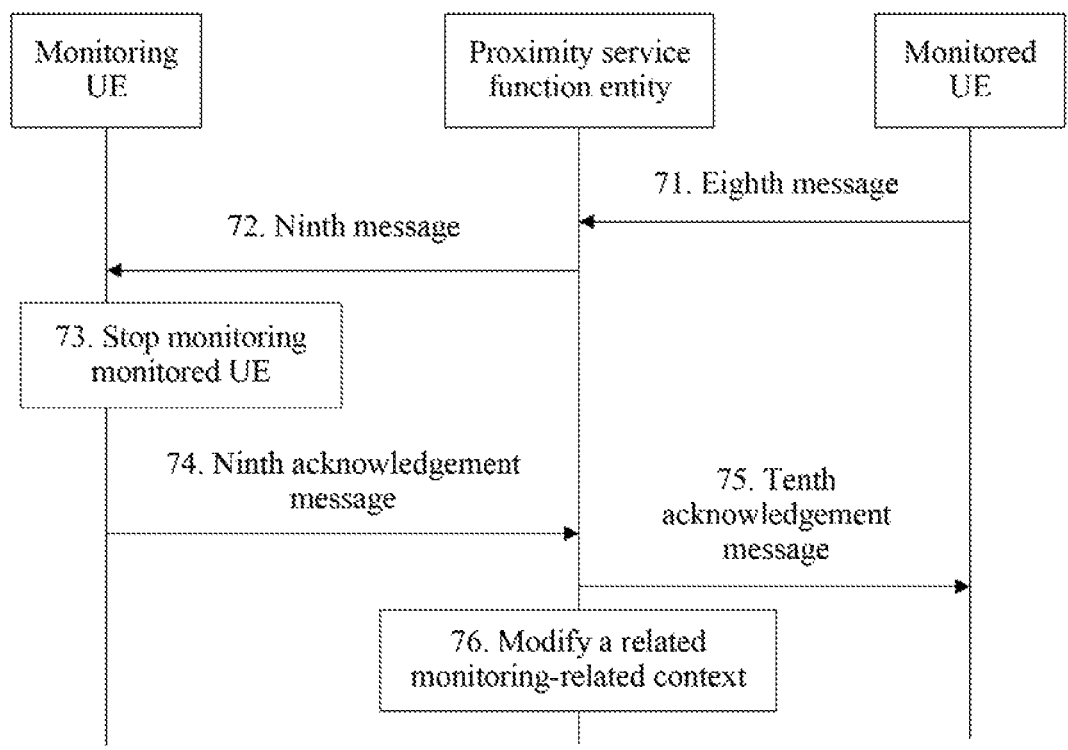
FIG. 7 is a flowchart of deactivation according to Embodiment 2 of the present disclosure.

In this embodiment, in the monitoring process, if the monitored user does not want to be monitored, the monitored UE may initiate a deactivation procedure. Referring to FIG. 7, the procedure includes:

71. The monitored UE sends an eighth message to the proximity service function entity, where the eighth message is used by the monitored UE to initiate a deactivation request, and the eighth message carries the broadcast code word of the monitored UE.

72. The proximity service function entity sends a ninth message to the monitoring UE according to the eighth message and the monitoring-related context, where the ninth message is used to instruct the monitoring UE to stop monitoring the monitored UE.

73. The monitoring UE stops monitoring the monitored UE according to the ninth message.

74. The monitoring UE feeds back a ninth acknowledgement message to the proximity service function entity.

75. The proximity service function entity feeds back a tenth acknowledgement message to the monitored UE.

76. The proximity service function entity modifies the related monitoring-related context.

Specifically, in the foregoing procedure of reallocating a broadcast code word, the alarm procedure, and the two deactivation procedures, when the monitoring UE and the monitored UE may roam, the monitoring UE first exchanges related information with the proximity service function entity of the operator to which the monitoring UE belongs, and the monitored UE first exchanges related information with the proximity service function entity of the operator to which the monitored UE belongs, and then the proximity service function entities of the operators to which the monitoring UE and the monitored UE respectively belong exchange the related information. Each proximity service function entity of a different operator may exchange related information with the application server.

In this embodiment of the present disclosure, a first message sent by monitoring UE is obtained, and a second message is sent to monitored UE, where the second message is used to apply to the monitored UE for monitoring authorization, so that the monitored UE can still learn that the monitoring UE sends a monitoring authorization application request to the monitored UE when broadcasting is not started, and further start to broadcast; then, a third message sent by the monitored UE is received; and if the third message indicates that a monitored user agrees to be monitored by a monitoring user, a fourth message is sent to the monitoring UE, where the fourth message carries a broadcast code word of the monitored UE, so that the monitoring UE can monitor the monitored UE according to the broadcast code word, thereby implementing that the monitoring user can still monitor and discover the monitored user when the monitored user does not actively broadcast. Moreover, in this embodiment, a case in which monitoring cannot be performed due to expiration or invalidity of the broadcast code word may be avoided by using a procedure of reallocating a broadcast code word. In addition, in this embodiment of the present disclosure, an alarm procedure may be further used to actively alarm the monitored UE. Furthermore, in this embodiment of the present disclosure, network resources occupied by the monitored UE and the monitoring UE may be further released in a timely manner by using deactivation procedures, so as to avoid waste of the network resources.

Embodiment 3

Figure 8:
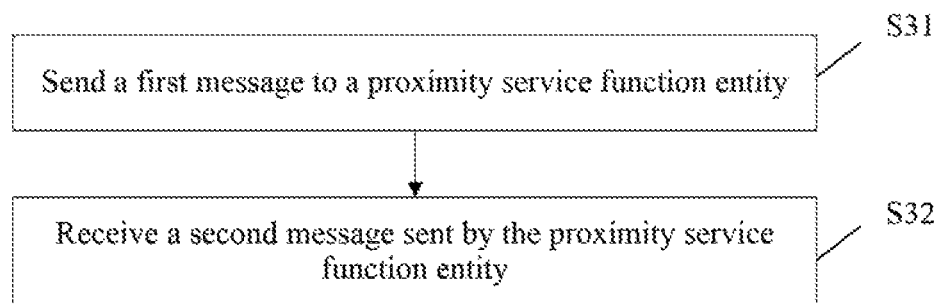
FIG. 8 is a flowchart of a user discovery method according to Embodiment 3 of the present disclosure.

This embodiment of the present disclosure provides a user discovery method. The method may be executed by monitoring UE. Referring to FIG. 8, the method includes the following steps.

Step S31: Send a first message to a proximity service function entity, where the first message is used to request to monitor monitored UE, the first message carries a command word, and the command word is used to apply for monitoring authorization.

Specifically, the first message may be implemented by adding a monitoring command word (that is, the command word in step S31) to a restricted discovery request. In actual application, the monitoring command word may be supervising. The monitoring command word may be used to enable the proximity service function entity to trigger an authentication procedure, and trigger the monitored UE to broadcast.

Step S32: Receive a second message sent by the proximity service function entity, where the second message is sent after the proximity service function entity receives a third message sent by the monitored UE and when the third message indicates that the monitored UE agrees to be monitored by the monitoring UE, the third message carries an identity of the monitored UE, and the second message carries the identity of the monitored UE and a broadcast code word of the monitored UE.

The broadcast code word of the monitored UE refers to a code word that is to be added to a broadcast message by the monitored UE.

Specifically, after receiving the broadcast code word of the monitored UE, the monitoring UE starts to monitor the monitored UE.

Optionally, in this embodiment, if the monitoring UE cannot monitor specific monitored UE, the method in this embodiment may further include:

sending a fourth message to the proximity service function entity, where the fourth message is used to prompt that the monitoring UE cannot monitor the monitored UE, and the fourth message carries the broadcast code word of the monitored UE or the identity of the monitored UE.

In actual application, the proximity service function entity sends an alarm to the monitored UE according to the fourth message. A specific alarm procedure is described in the foregoing, and details are not described herein again.

Optionally, in this embodiment, in a monitoring process, if a monitoring user does not want to perform monitoring, the method in this embodiment may further include:

sending a fifth message to the proximity service function entity, where the fifth message is used to initiate a deactivation request, and the fifth message carries the broadcast code word of the monitored UE.

In actual application, the proximity service function entity sends a sixth message to the monitored UE according to the fifth message and a monitoring-related context. The sixth message is used to instruct the monitored UE to stop broadcasting. A specific deactivation procedure is described in the foregoing, and details are not described herein again.

It should be noted that the first message in this embodiment is corresponding to the first message in Embodiment 2, the second message is corresponding to the fourth message in Embodiment 2, the third message is corresponding to the third message in Embodiment 2, the fourth message is corresponding to the fifth message in Embodiment 2, the fifth message is corresponding to the sixth message in Embodiment 2, and the sixth message is corresponding to the seventh message in Embodiment 2.

In this embodiment of the present disclosure, a first message sent by monitoring UE is obtained, and a second message is sent to monitored UE, where the second message is used to apply to the monitored UE for monitoring authorization, so that the monitored UE can still learn that the monitoring UE sends a monitoring authorization application request to the monitored UE when broadcasting is not started, and further start to broadcast; then, a third message sent by the monitored UE is received; and if the third message indicates that a monitored user agrees to be monitored by a monitoring user, a fourth message is sent to the monitoring UE, where the fourth message carries a broadcast code word of the monitored UE, so that the monitoring UE can monitor the monitored UE according to the broadcast code word, thereby implementing that the monitoring user can still monitor and discover the monitored user when the monitored user does not actively broadcast.

Embodiment 4

Figure 9:
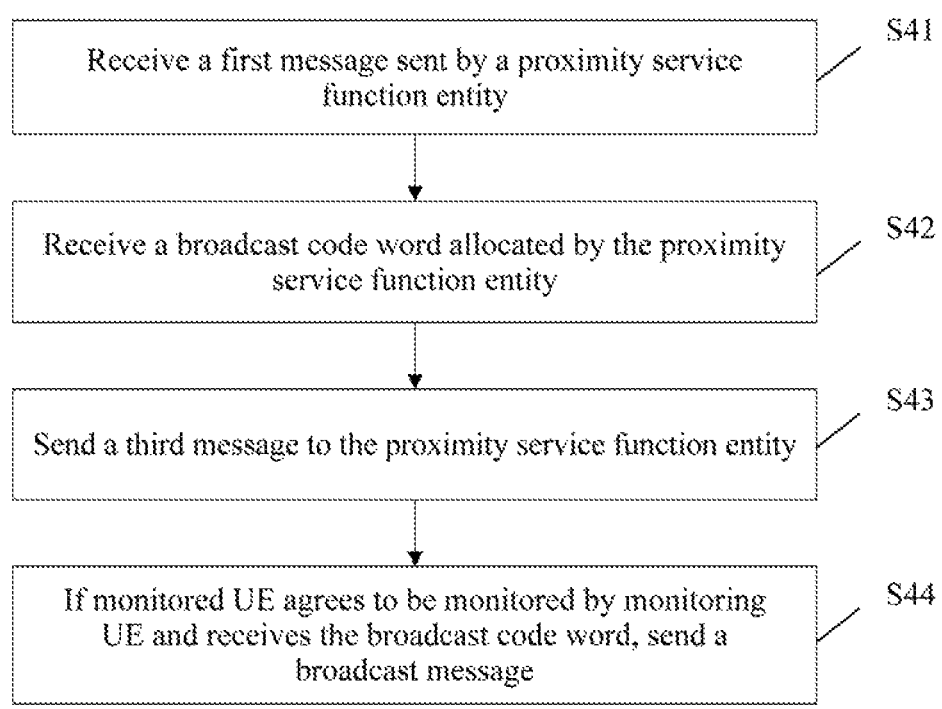
FIG. 9 is a flowchart of a user discovery method according to Embodiment 4 of the present disclosure.

This embodiment of the present disclosure provides a user discovery method. The method may be executed by monitored UE. Referring to FIG. 9, the method includes the following steps.

Step S41: Receive a first message sent by a proximity service function entity, where the first message is sent after the proximity service function entity receives a second message sent by monitoring UE, the second message is used by the monitoring UE to request to monitor the monitored UE, the second message carries a command word, the command word is used to apply for monitoring authorization, the first message is used to apply for monitoring authorization, and the first message carries an identity of the monitoring UE.

In this embodiment, the first message may further carry a command word.

In this embodiment, the monitored UE learns, according to the received first message, that the UE sends a monitoring request to the monitored UE. The monitored UE may prompt, according to the first message, a user whether to accept monitoring. The user may choose, by using a user command, whether to accept the monitoring. After receiving the user command, the monitored UE sends corresponding information according to the received user command.

Step S42: Receive a broadcast code word allocated by the proximity service function entity.

Step S43: Send a third message to the proximity service function entity, where the third message is used to indicate whether monitoring by the monitoring UE is agreed, and the third message carries an identity of the monitored UE.

Specifically, if the monitored UE agrees to be monitored by the monitoring UE and receives the broadcast code word, the method further includes step S44.

Step S44: Send a broadcast message, where the broadcast message carries the broadcast code word of the monitored UE.

Optionally, in this embodiment, in a monitoring process, if the monitored user does not want to be monitored, the method in this embodiment may further include:

sending a fourth message to the proximity service function entity, where the fourth message is used to initiate a deactivation request, and the fourth message carries the broadcast code word of the monitored UE.

In actual application, the proximity service function entity sends a fifth message to the monitoring UE according to the fourth message and a monitoring-related context. The fifth message is used to instruct the monitoring UE to stop monitoring the monitored UE. A specific deactivation procedure is described in the foregoing, and details are not described herein again.

It should be noted that the first message in this embodiment is corresponding to the second message in Embodiment 2, the second message is corresponding to the first message in Embodiment 2, the third message is corresponding to the third message in Embodiment 2, the fourth message is corresponding to the eighth message in Embodiment 2, and the fifth message is corresponding to the ninth message in Embodiment 2.

In this embodiment of the present disclosure, a first message sent by monitoring UE is obtained, and a second message is sent to monitored UE, where the second message is used to apply to the monitored UE for monitoring authorization, so that the monitored UE can still learn that the monitoring UE sends a monitoring authorization application request to the monitored UE when broadcasting is not started, and further start to broadcast; then, a third message sent by the monitored UE is received, and if the third message indicates that a monitored user agrees to be monitored by a monitoring user, a fourth message is sent to the monitoring UE, where the fourth message carries a broadcast code word of the monitored UE, so that the monitoring UE can monitor the monitored UE according to the broadcast code word, thereby implementing that the monitoring user can still monitor and discover the monitored user when the monitored user does not actively broadcast.

Embodiment 5

Figure 10:
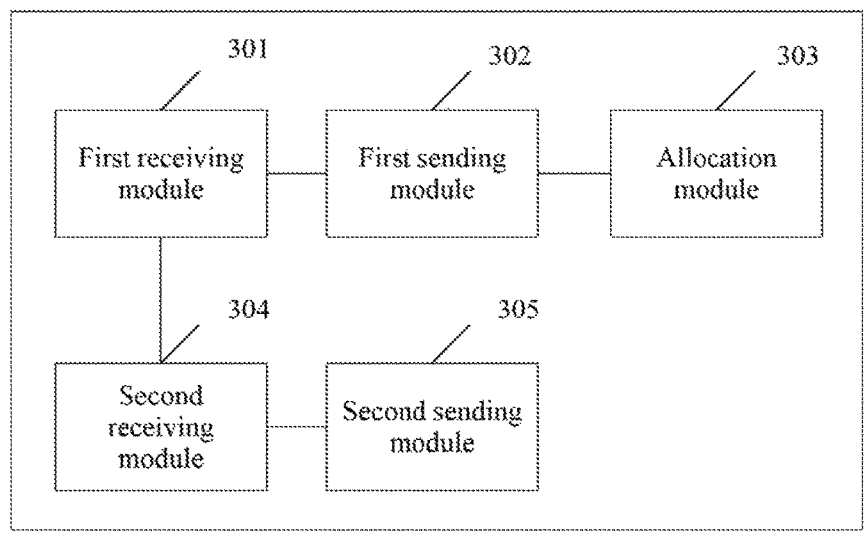
FIG. 10 is a schematic structural diagram of a proximity service function entity according to Embodiment 5 of the present disclosure.

This embodiment of the present disclosure provides a proximity service function entity. Referring to FIG. 10, the proximity service function entity includes a first receiving module 301, a first sending module 302, an allocation module 303, a second receiving module 304, and a second sending module 305.

The first receiving module 301 is configured to receive a first message sent by monitoring UE, where the first message is used to request to monitor monitored UE, the first message carries a command word, and the command word is used to apply for monitoring authorization.

Specifically, the first message may be implemented by adding a monitoring command word to a restricted discovery request. In actual application, the monitoring command word may be supervising. The monitoring command word may be used to enable the proximity service function entity to trigger an authentication procedure, and trigger the monitored UE to broadcast.

It should be noted that, in this embodiment of the present disclosure, the monitoring UE refers to UE used by a monitoring user. Likewise, the monitored UE refers to UE used by a monitored user.

The first sending module 302 is configured to send a second message to the monitored UE, where the second message is used to apply to the monitored UE for monitoring authorization, and the second message carries an identity of the monitoring UE.

In this embodiment, the second message may further carry a command word.

In this embodiment, the monitored UE learns, according to the received second message, that the UE sends a monitoring request to the monitored UE. The monitored UE may prompt, according to the second message, the user whether to accept monitoring. The user may choose, by using a user command, whether to accept the monitoring. After receiving the user command, the monitored UE sends corresponding information according to the received user command.

Specifically, an identity of the monitoring UE may be a fixed ID (for example, a subscriber identity module (SIM) card ID) of the user, or may be a temporary ID allocated to the user. An identity in this embodiment is a temporary ID. The temporary ID may prevent an application server from learning mobile network identity information of UE, and ensure security of the mobile network identity information of a user.

If the identity is a temporary ID, the temporary ID is allocated by the proximity service function entity to the UE. The temporary ID may include a public land mobile network (PLMN) ID, and is used to uniquely determine the UE in an evolved packet core (EPC) network.

The allocation module 303 is configured to allocate a broadcast code word to the monitored UE.

The second receiving module 304 is configured to receive a third message sent by the monitored UE, where the third message is used to indicate whether the monitored UE agrees to be monitored by the monitoring UE, and the third message carries an identity of the monitored UE.

The second sending module 305 is configured to: when the third message indicates that the monitored UE agrees to be monitored by the monitoring UE, send a fourth message to the monitoring UE, where the fourth message carries the identity of the monitored UE and the broadcast code word of the monitored UE.

The broadcast code word of the monitored UE refers to a code word that is to be added to a broadcast message by the monitored UE.

Specifically, after receiving the broadcast code word of the monitored UE, the monitoring UE starts to monitor the monitored UE.

In this embodiment of the present disclosure, a first message sent by monitoring UE is obtained, and a second message is sent to monitored UE, where the second message is used to apply to the monitored UE for monitoring authorization, so that the monitored UE can still learn that the monitoring UE sends a monitoring authorization application request to the monitored UE when broadcasting is not started; then, a third message sent by the monitored UE is received; and if the third message indicates that a monitored user agrees to be monitored by a monitoring user, a fourth message is sent to the monitoring UE, where the fourth message carries a broadcast code word of the monitored UE, so that the monitoring UE can monitor the monitored UE according to the broadcast code word, thereby implementing that the monitoring user can still monitor and discover the monitored user when the monitored user does not actively broadcast.

Embodiment 6

Figure 11:
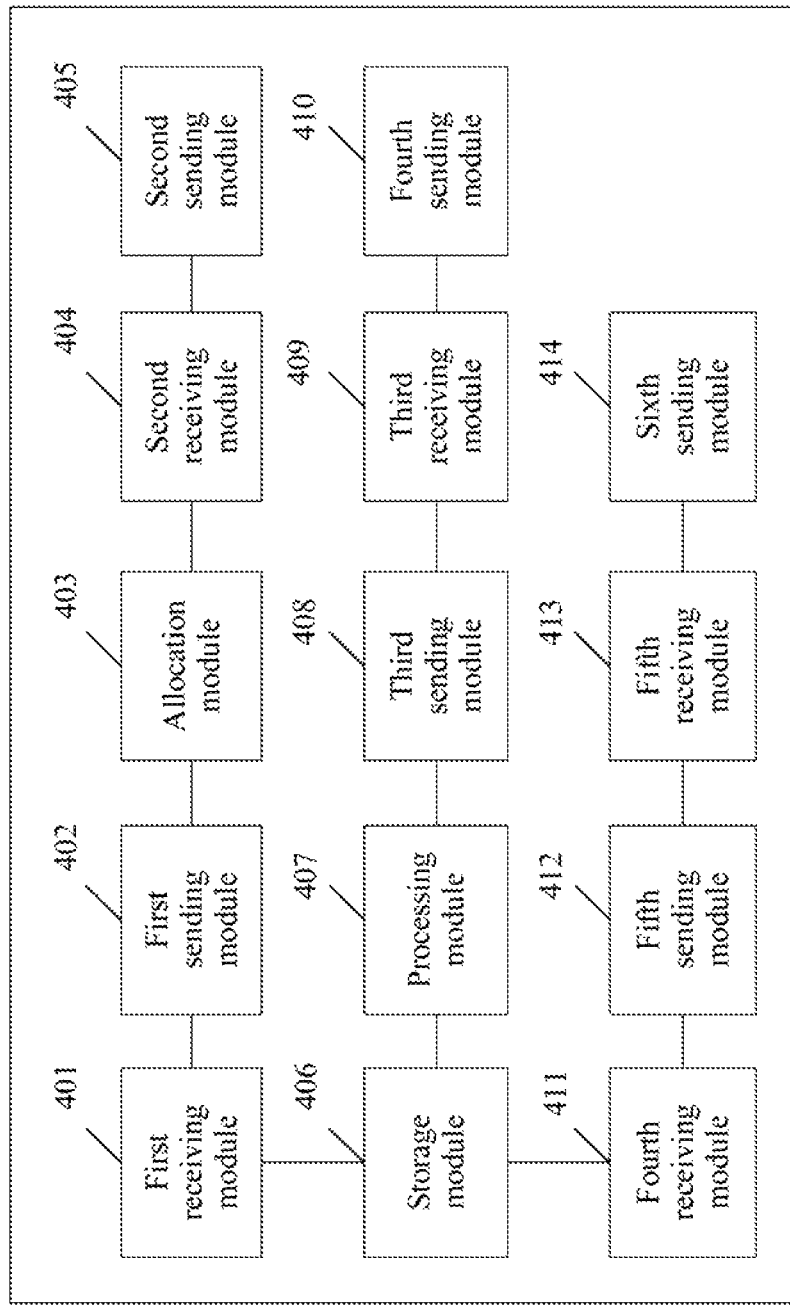
FIG. 11 is a schematic structural diagram of a proximity service function entity according to Embodiment 6 of the present disclosure.

This embodiment of the present disclosure provides a proximity service function entity. Referring to FIG. 11, the proximity service function entity includes a first receiving module 401, a first sending module 402, an allocation module 403, a second receiving module 404, and a second sending module 405.

The first receiving module 401 is configured to receive a first message sent by monitoring UE, where the first message is used to request to monitor monitored UE, the first message carries a command word, and the command word is used to apply for monitoring authorization.

Specifically, the first message may be implemented by adding a monitoring command word to a restricted discovery request. In actual application, the monitoring command word may be supervising. The monitoring command word may be used to enable the proximity service function entity to trigger an authentication procedure, and trigger the monitored UE to broadcast.

It should be noted that, in this embodiment of the present disclosure, the monitoring UE refers to UE used by a monitoring user. Likewise, the monitored UE refers to UE used by a monitored user.

The first sending module 402 is configured to send a second message to the monitored UE, where the second message is used to apply to the monitored UE for monitoring authorization, and the second message carries an identity of the monitoring UE.

In this embodiment, the second message may further carry a command word.

In this embodiment, the monitored UE learns, according to the received second message, that the UE sends a monitoring request to the monitored UE. The monitored UE may prompt, according to the second message, the user whether to accept monitoring. The user may choose, by using a user command, whether to accept the monitoring. After receiving the user command, the monitored UE sends corresponding information according to the received user command.

Specifically, an identity of the monitoring UE may be a fixed ID (for example, a subscriber identity module (SIM) card ID) of the user, or may be a temporary ID allocated to the user. A first identity in this embodiment is a temporary ID. The temporary ID may prevent an application server from learning mobile network identity information of UE, and ensure security of the mobile network identity information of a user.

If the identity is a temporary ID, the temporary ID is allocated by the proximity service function entity to the UE. The temporary ID may include a public land mobile network (PLMN) ID, and is used to uniquely determine the UE in an evolved packet core (EPC) network.

The allocation module 403 is configured to allocate a broadcast code word to the monitored UE.

The second receiving module 404 is configured to receive a third message sent by the monitored UE, where the third message is used to indicate whether the monitored UE agrees to be monitored by the monitoring UE, and the third message carries an identity of the monitored UE.

The second sending module 405 is configured to: when the third message indicates that the monitored UE agrees to be monitored by the monitoring UE, send a fourth message to the monitoring UE, where the fourth message carries the identity of the monitored UE and the broadcast code word of the monitored UE.

The broadcast code word of the monitored UE refers to a code word that is to be added to a broadcast message by the monitored UE.

Specifically, after receiving the broadcast code word of the monitored UE, the monitoring UE starts to monitor the monitored UE.

Specifically, the proximity service function entity further includes:

a storage module 406, configured to store a monitoring-related context, where the monitoring-related context includes the identity of the monitored UE, the identity of the monitoring UE, the broadcast code word of the monitored UE, and a life cycle of the broadcast code word of the monitored UE.

Specifically, the monitoring-related context may further include information such as monitoring duration.

Specifically, the proximity service function entity further includes:

a processing module 407, configured to: when the life cycle of the broadcast code word of the monitored UE expires, allocate a new broadcast code word to the monitored UE; and a third sending module 408, configured to send, according to the stored monitoring-related context, the new broadcast code word to the monitoring UE corresponding to the monitored UE.

Specifically, the proximity service function entity further includes:

a third receiving module 409, configured to receive a fifth message sent by the monitoring UE, where the fifth message is used to prompt that the monitoring UE cannot monitor the monitored UE, and the fifth message carries the broadcast code word of the monitored UE or the identity of the monitored UE; and a fourth sending module 410, configured to send an alarm to the monitored UE according to the fifth message.

Specifically, the proximity service function entity further includes:

a fourth receiving module 411, configured to receive a sixth message sent by the monitoring UE, where the sixth message is used by the monitoring UE to initiate a deactivation request, and the sixth message carries the broadcast code word of the monitored UE; and a fifth sending module 412, configured to send a seventh message to the monitored UE according to the sixth message and the monitoring-related context, where the seventh message is used to instruct the monitored UE to stop broadcasting.

Specifically, the proximity service function entity further includes:

a fifth receiving module 413, configured to receive an eighth message sent by the monitored UE, where the eighth message is used by the monitored UE to initiate a deactivation request, and the eighth message carries the broadcast code word of the monitored UE; and a sixth sending module 414, configured to send a ninth message to the monitoring UE according to the eighth message and the monitoring-related context, where the ninth message is used to instruct the monitoring UE to stop monitoring the monitored UE.

In this embodiment of the present disclosure, a first message sent by monitoring UE is obtained, and a second message is sent to monitored UE, where the second message is used to apply to the monitored UE for monitoring authorization, so that the monitored UE can still learn that the monitoring UE sends a monitoring authorization application request to the monitored UE when broadcasting is not started; then, a third message sent by the monitored UE is received; and if the third message indicates that a monitored user agrees to be monitored by a monitoring user, a fourth message is sent to the monitoring UE, where the fourth message carries a broadcast code word of the monitored UE, so that the monitoring UE can monitor the monitored UE according to the broadcast code word, thereby implementing that the monitoring user can still monitor and discover the monitored user when the monitored user does not actively broadcast. Moreover, in this embodiment, a case in which monitoring cannot be performed due to expiration or invalidity of the broadcast code word may be avoided by using a procedure of reallocating a broadcast code word. In addition, in this embodiment of the present disclosure, an alarm procedure may be further used to actively alarm the monitored UE. Furthermore, in this embodiment of the present disclosure, network resources occupied by the monitored UE and the monitoring UE may be further released in a timely manner by using deactivation procedures, so as to avoid waste of the network resources.

Embodiment 7

Figure 12:
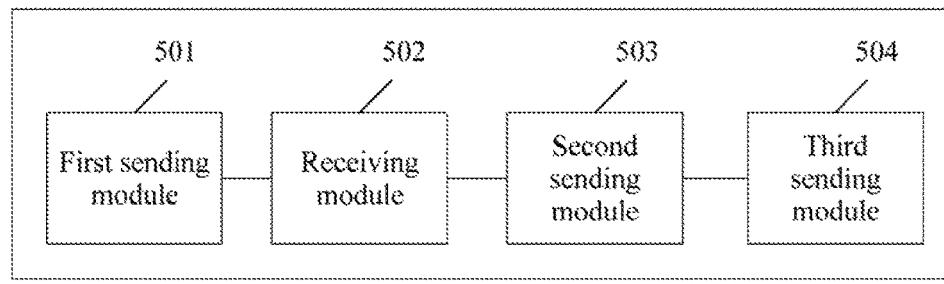
FIG. 12 is a schematic structural diagram of user equipment according to Embodiment 7 of the present disclosure.

This embodiment of the present disclosure provides user equipment. Referring to FIG. 12, the user equipment includes a first sending module 501 and a receiving module 502.

The first sending module 501 is configured to send a first message to a proximity service function entity, where the first message is used to request to monitor monitored UE, the first message carries a command word, and the command word is used to apply for monitoring authorization.

Specifically, the first message may be implemented by adding a monitoring command word to a restricted discovery request. In actual application, the monitoring command word may be supervising. The monitoring command word may be used to enable the proximity service function entity to trigger an authentication procedure, and trigger the monitored UE to broadcast.

The receiving module 502 is configured to receive a second message sent by the proximity service function entity, where the second message is sent after the proximity service function entity receives a third message sent by the monitored UE and when the third message indicates that the monitored UE agrees to be monitored by the monitoring UE, the third message carries an identity of the monitored UE, and the second message carries the identity of the monitored UE and a broadcast code word of the monitored UE.

The broadcast code word of the monitored UE refers to a code word that is to be added to a broadcast message by the monitored UE.

Specifically, after receiving the broadcast code word of the monitored UE, the monitoring UE starts to monitor the monitored UE.

In this embodiment, if the monitoring UE cannot monitor specific monitored UE, the user equipment further includes:

a second sending module 503, configured to send a fourth message to the proximity service function entity, where the fourth message is used to prompt that the monitoring UE cannot monitor the monitored UE, and the fourth message carries the broadcast code word of the monitored UE or the identity of the monitored UE.

In this embodiment, in a monitoring process, if a monitoring user does not want to perform monitoring, the user equipment further includes:

a third sending module 504, configured to send a fifth message to the proximity service function entity, where the fifth message is used to initiate a deactivation request, and the fifth message carries the broadcast code word of the monitored UE.

It should be noted that the first message in this embodiment is corresponding to the first message in Embodiment 2, the second message is corresponding to the fourth message in Embodiment 2, the third message is corresponding to the third message in Embodiment 2, the fourth message is corresponding to the fifth message in Embodiment 2, and the fifth message is corresponding to the sixth message in Embodiment 2.

In this embodiment of the present disclosure, a first message sent by monitoring UE is obtained, and a second message is sent to monitored UE, where the second message is used to apply to the monitored UE for monitoring authorization, so that the monitored UE can still learn that the monitoring UE sends a monitoring authorization application request to the monitored UE when broadcasting is not started, and further start to broadcast; then, a third message sent by the monitored UE is received; and if the third message indicates that a monitored user agrees to be monitored by a monitoring user, a fourth message is sent to the monitoring UE, where the fourth message carries a broadcast code word of the monitored UE, so that the monitoring UE can monitor the monitored UE according to the broadcast code word, thereby implementing that the monitoring user can still monitor and discover the monitored user when the monitored user does not actively broadcast.

Embodiment 8

Figure 13:
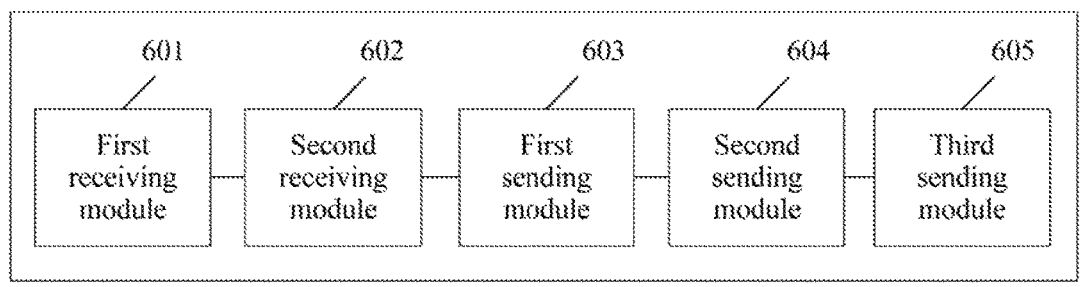
FIG. 13 is a schematic structural diagram of user equipment according to Embodiment 8 of the present disclosure.

This embodiment of the present disclosure provides user equipment. Referring to FIG. 13, the user equipment includes a first receiving module 601, a second receiving module 602, and a first sending module 603.

The first receiving module 601 is configured to receive a first message sent by a proximity service function entity, where the first message is sent after the proximity service function entity receives a second message sent by monitoring UE, the second message is used by the monitoring UE to request to monitor the monitored UE, the second message carries a command word, the command word is used to apply for monitoring authorization, the first message is used to apply for monitoring authorization, and the first message carries an identity of the monitoring UE.

In this embodiment, the first message may further carry a command word.

In this embodiment, the monitored UE learns, according to the received first message, that the UE sends a monitoring request to the monitored UE. The monitored UE may prompt, according to the first message, a user whether to accept monitoring. The user may choose, by using a user command, whether to accept the monitoring. After receiving the user command, the monitored UE sends corresponding information according to the received user command.

The second receiving module 602 is configured to receive a broadcast code word allocated by the proximity service function entity.

The first sending module 603 is configured to send a third message to the proximity service function entity, where the third message is used to indicate whether monitoring by the monitoring UE is agreed, and the third message carries an identity of the monitored UE.

In this embodiment, in a monitoring process, if the monitored user does not want to be monitored, the user equipment further includes:

a second sending module 604, configured to send a fourth message to the proximity service function entity, where the fourth message is used to initiate a deactivation request, and the fourth message carries the broadcast code word of the monitored UE.

Specifically, the user equipment further includes:

a third sending module 605, configured to: when the monitored UE agrees to be monitored by the monitoring UE and receives the broadcast code word, send a broadcast message, where the broadcast message carries the broadcast code word of the monitored UE.

It should be noted that the first message in this embodiment is corresponding to the second message in Embodiment 2, the second message is corresponding to the first message in Embodiment 2, the third message is corresponding to the third message in Embodiment 2, and the fourth message is corresponding to the eighth message in Embodiment 2.

In this embodiment of the present disclosure, a first message sent by monitoring UE is obtained, and a second message is sent to monitored UE, where the second message is used to apply to the monitored UE for monitoring authorization, so that the monitored UE can still learn that the monitoring UE sends a monitoring authorization application request to the monitored UE when broadcasting is not started, and further start to broadcast; then, a third message sent by the monitored UE is received; and if the third message indicates that a monitored user agrees to be monitored by a monitoring user, a fourth message is sent to the monitoring UE, where the fourth message carries a broadcast code word of the monitored UE, so that the monitoring UE can monitor the monitored UE according to the broadcast code word, thereby implementing that the monitoring user can still monitor and discover the monitored user when the monitored user does not actively broadcast.

Embodiment 9

Figure 14:
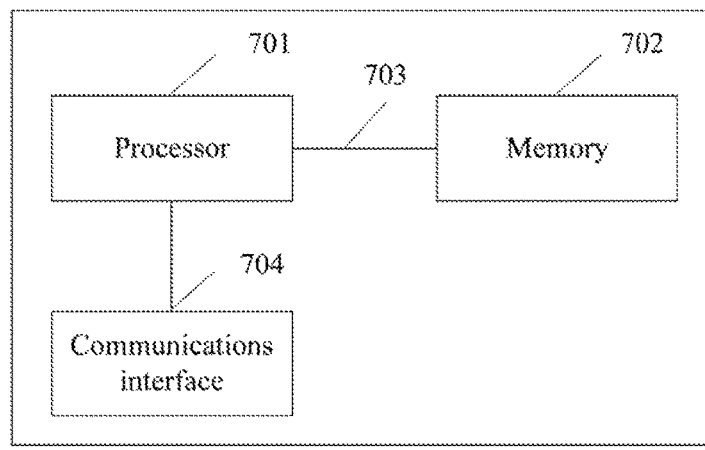
FIG. 14 is a schematic structural diagram of a proximity service function entity according to Embodiment 9 of the present disclosure.

This embodiment of the present disclosure provides a proximity service function entity. Referring to FIG. 14, the proximity service function entity includes:

a processor 701, a memory 702, a bus 703, and a communications interface 704, where the memory 702 is configured to store a computer executable instruction, the processor 701 and the memory 702 are connected by using the bus 703, and when a computer runs, the processor 701 executes the computer executable instruction stored in the memory, so that the computer executes the method described in Embodiment 1 or Embodiment 2.

In this embodiment of the present disclosure, a first message sent by monitoring UE is obtained, and a second message is sent to monitored UE, where the second message is used to apply to the monitored UE for monitoring authorization, so that the monitored UE can still learn that the monitoring UE sends a monitoring authorization application request to the monitored UE when broadcasting is not started, and further start to broadcast; then, a third message sent by the monitored UE is received; and if the third message indicates that a monitored user agrees to be monitored by a monitoring user, a fourth message is sent to the monitoring UE, where the fourth message carries a broadcast code word of the monitored UE, so that the monitoring UE can monitor the monitored UE according to the broadcast code word, thereby implementing that the monitoring user can still monitor and discover the monitored user when the monitored user does not actively broadcast.

Embodiment 10

Figure 15:
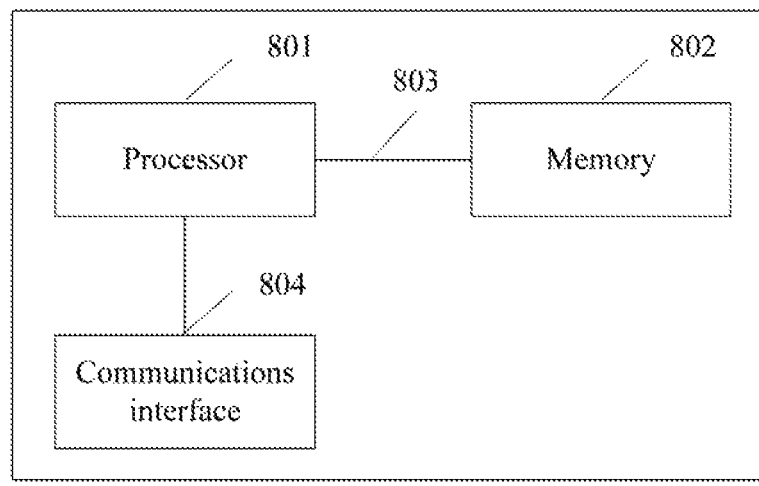
FIG. 15 is a schematic structural diagram of user equipment according to Embodiment 10 of the present disclosure.

This embodiment of the present disclosure provides user equipment. Referring to FIG. 15, the user equipment includes:

a processor 801, a memory 802, a bus 803, and a communications interface 804, where the memory 802 is configured to store a computer executable instruction, the processor 801 and the memory 802 are connected by using the bus 803, and when a computer runs, the processor 801 executes the computer executable instruction stored in the memory, so that the computer executes the method described in Embodiment 3 or the method executed by the monitoring UE in Embodiment 2.

In this embodiment of the present disclosure, a first message sent by monitoring UE is obtained, and a second message is sent to monitored UE, where the second message is used to apply to the monitored UE for monitoring authorization, so that the monitored UE can still learn that the monitoring UE sends a monitoring authorization application request to the monitored UE when broadcasting is not started, and further start to broadcast; then, a third message sent by the monitored UE is received; and if the third message indicates that a monitored user agrees to be monitored by a monitoring user, a fourth message is sent to the monitoring UE, where the fourth message carries a broadcast code word of the monitored UE, so that the monitoring UE can monitor the monitored UE according to the broadcast code word, thereby implementing that the monitoring user can still monitor and discover the monitored user when the monitored user does not actively broadcast.

Embodiment 11

Figure 16:
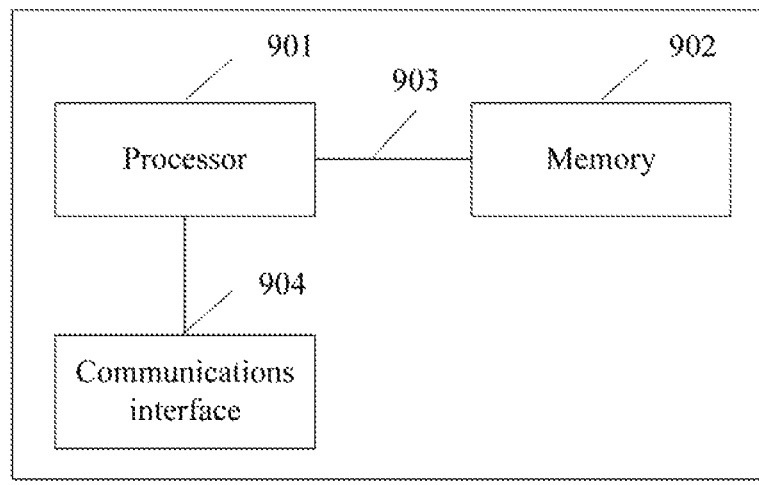
FIG. 16 is a schematic structural diagram of user equipment according to Embodiment 11 of the present disclosure.

This embodiment of the present disclosure provides user equipment. Referring to FIG. 16, the user equipment includes:

a processor 901, a memory 902, a bus 903, and a communications interface 904, where the memory 902 is configured to store a computer executable instruction, the processor 901 and the memory 902 are connected by using the bus 903, and when a computer runs, the processor 901 executes the computer executable instruction stored in the memory, so that the computer executes the method described in Embodiment 4 or the method executed by the monitored UE in Embodiment 2.

In this embodiment of the present disclosure, a first message sent by monitoring UE is obtained, and a second message is sent to monitored UE, where the second message is used to apply to the monitored UE for monitoring authorization, so that the monitored UE can still learn that the monitoring UE sends a monitoring authorization application request to the monitored UE when broadcasting is not started, and further start to broadcast; then, a third message sent by the monitored UE is received, and if the third message indicates that a monitored user agrees to be monitored by a monitoring user, a fourth message is sent to the monitoring UE, where the fourth message carries a broadcast code word of the monitored UE, so that the monitoring UE can monitor the monitored UE according to the broadcast code word, thereby implementing that the monitoring user can still monitor and discover the monitored user when the monitored user does not actively broadcast.

The sequence numbers of the foregoing embodiments of the present disclosure are merely for illustrative purposes, and are not intended to indicate priorities of the embodiments.

It should be noted that, when the proximity service function entity provided in the foregoing embodiments implements the user discovery method, division of the foregoing function modules is used as an example for illustration. In actual application, the foregoing functions can be allocated to different function modules and implemented according to a requirement, that is, an inner structure of a device is divided into different function modules to implement all or some of the functions described above. In addition, the proximity service function entity provided in the foregoing embodiments pertains to a same concept as the embodiments of the user discovery method. For a specific implementation process of the proximity service function entity, refer to the method embodiments, and details are not described herein again.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, or an optical disc.

The foregoing descriptions are merely example embodiments of the present disclosure, but are not intended to limit the present disclosure. Any modification, equivalent replacement, and improvement made without departing from the spirit and principle of the present disclosure shall fall within the protection scope of the present disclosure.

What is claimed is:

1. A method of user discovery, comprising:
   receiving a first message sent by a first terminal device, wherein the first message is used to request to monitor a second terminal device, the first message carries a command word, and the command word is used to apply for monitoring authorization;
   sending a second message to the second terminal device, wherein the second message is used to apply to the second terminal device for monitoring authorization, and the second message carries an identity of the first terminal device;
   allocating a broadcast code word to the second terminal device;
   receiving a third message sent by the second terminal device, wherein the third message is used to indicate whether the second terminal device agrees to be monitored by the first terminal device, and the third message carries an identity of the second terminal device;
   if when the third message indicates that the second terminal device agrees to be monitored by the first terminal device, sending a fourth message to the first terminal device, wherein the fourth message carries the identity of the second terminal device and the broadcast code word of the second terminal device; and
   receiving an additional message used to initiate a deactivation request, and the additional message carries the broadcast code word of the second terminal device.

2. The method according to claim 1, wherein the method further comprises:
   saving a monitoring-related context, wherein the monitoring-related context comprises the identity of the second terminal device, the identity of the first terminal device, the broadcast code word of the second terminal device, and a life cycle of the broadcast code word of the second terminal device.

3. The method according to claim 2, wherein the method further comprises:
when the life cycle of the broadcast code word of the second terminal device expires, allocating a new broadcast code word to the second terminal device; and
sending the new broadcast code word to the first terminal device according to the saved monitoring-related context.

4. The method according to claim 2, wherein the method further comprises:
receiving a fifth message sent by the first terminal device, wherein the fifth message is used to prompt that the first terminal device cannot monitor the second terminal device, and the fifth message carries the broadcast code word of the second terminal device or the identity of the second terminal device; and
sending an alarm to the second terminal device according to the fifth message.

5. The method according to claim 2, wherein the additional message sent by the first terminal device is a sixth message, and wherein the method further comprises:
receiving the sixth message sent by the first terminal device, wherein the sixth message is used by the first terminal device to initiate the deactivation request, and the sixth message carries the broadcast code word of the second terminal device; and
sending a seventh message to the second terminal device according to the sixth message and the monitoring-related context, wherein the seventh message is used to instruct the second terminal device to stop broadcasting.

6. The method according to claim 2, wherein the additional message sent by the first terminal device is an eighth message and wherein the method further comprises:
receiving the eighth message sent by the second terminal device, wherein the eighth message is used by the second terminal device to initiate the deactivation request, and the eighth message carries the broadcast code word of the second terminal device; and
sending a ninth message to the first terminal device according to the eighth message and the monitoring-related context, wherein the ninth message is used to instruct the first terminal device to stop monitoring the second terminal device.

7. A user discovery method, wherein the method comprises:
receiving a first message sent by a proximity service function entity, wherein the first message is sent after the proximity service function entity receives a second message sent by first terminal device, the second message is used by the first terminal device to request to monitor second terminal device, the second message carries a command word, the command word is used to apply for monitoring authorization, the first message is used to apply for monitoring authorization, and the first message carries an identity of the first terminal device;
receiving a broadcast code word allocated by the proximity service function entity; and
sending a third message to the proximity service function entity, wherein the third message is used to indicate whether monitoring by the first terminal device is agreed, and the third message carries an identity of the second terminal device; and
sending a fourth message to the proximity service function entity, wherein the fourth message is used to initiate a deactivation request, and the fourth message carries the broadcast code word of the second terminal device.

8. The method according to claim 7, wherein the method further comprises:
when the second terminal device agrees to be monitored by the first terminal device and receives the broadcast code word, sending a broadcast message, wherein the broadcast message carries the broadcast code word of the second terminal device.

9. A proximity service function entity, wherein the proximity service function entity comprises:
at least one processor, a memory, a bus, and a communications interface, wherein the memory is configured to store a computer executable instruction, the processor and the memory are connected by using the bus, and the at least one processor is configured to execute the computer executable instruction stored in the memory, wherein the computer executable instruction comprises instructions to:
receive a first message sent by a first terminal device, wherein the first message is used to request to monitor a second terminal device, the first message carries a command word, and the command word is used to apply for monitoring authorization;
send a second message to the second terminal device, wherein the second message is used to apply to the second terminal device for monitoring authorization, and the second message carries an identity of the first terminal device;
allocate a broadcast code word to the second terminal device;
receive a third message sent by the second terminal device, wherein the third message is used to indicate whether the second terminal device agrees to be monitored by the first terminal device, and the third message carries an identity of the second terminal device;
when the third message indicates that the second terminal device agrees to be monitored by the first terminal device, send a fourth message to the first terminal device, wherein the fourth message carries the identity of the second terminal device and the broadcast code word of the second terminal device; and
receive an additional message used to initiate a deactivation request, and the additional message carries the broadcast code word of the second terminal device.

10. The proximity service function entity according to claim 9, wherein the computer executable instruction further comprises instructions to:
save a monitoring-related context, wherein the monitoring-related context comprises the identity of the second terminal device, the identity of the first terminal device, the broadcast code word of the second terminal device, and a life cycle of the broadcast code word of the second terminal device.

11. The proximity service function entity according to claim 10, wherein the computer executable instruction further comprises instructions to:
when the life cycle of the broadcast code word of the second terminal device expires, allocate a new broadcast code word to the second terminal device; and
send the new broadcast code word to the first terminal device according to the saved monitoring-related context.

12. The proximity service function entity according to claim 10, wherein the computer executable instruction further comprises instructions to:

receive a fifth message sent by the first terminal device, wherein the fifth message is used to prompt that the first terminal device cannot monitor the second terminal device, and the fifth message carries the broadcast code word of the second terminal device or the identity of the second terminal device; and send an alarm to the second terminal device according to the fifth message.

13. The proximity service function entity according to claim 10, wherein the additional message sent by the first terminal device is a sixth message and wherein the computer executable instruction further comprises instructions to:

receive the sixth message sent by the first terminal device, wherein the sixth message is used by the first terminal device to initiate the deactivation request, and the sixth message carries the broadcast code word of the second terminal device; and send a seventh message to the second terminal device according to the sixth message and the monitoring-related context, wherein the seventh message is used to instruct the second terminal device to stop broadcasting.

14. The proximity service function entity according to claim 10, wherein the additional message sent by the first terminal device is an eighth message and wherein the computer executable instruction further comprises instructions to:

receive the eighth message sent by the second terminal device, wherein the eighth message is used by the second terminal device to initiate the deactivation request, and the eighth message carries the broadcast code word of the second terminal device; and send a ninth message to the first terminal device according to the eighth message and the monitoring-related context, wherein the ninth message is used to instruct the first terminal device to stop monitoring the second terminal device.

15. A terminal device, comprising:

at least one processor, a memory, a bus, and a communications interface, wherein the memory is configured to store a computer executable instruction, the at least one processor and the memory are connected by using the bus, and the at least one processor is configured to execute the computer executable instruction stored in the memory, wherein the computer executable instruction comprises instructions to:

receive a first message sent by a proximity service function entity, wherein the first message is sent after the proximity service function entity receives a second message sent by other terminal device, the second message is used by the other terminal device to request to monitor the terminal device, the second message carries a command word, the command word is used to apply for monitoring authorization, the first message is used to apply for monitoring authorization, and the first message carries an identity of the other terminal device;

receive a broadcast code word allocated by the proximity service function entity; and send a third message to the proximity service function entity, wherein the third message is used to indicate whether monitoring by the other terminal device is agreed, and the third message carries an identity of the terminal device; and send a fourth message to the proximity service function entity, wherein the fourth message is used to initiate a deactivation request, and the fourth message carries the broadcast code word of the terminal device.

16. The terminal device according to claim 15, wherein the computer executable instruction further comprises instructions to:

when the terminal device agrees to be monitored by the other terminal device and receives the broadcast code word, send a broadcast message, wherein the broadcast message carries the broadcast code word of the terminal device.

* * * * *

UNITED STATES PATENT AND TRADEMARK OFFICE
CERTIFICATE OF CORRECTION

PATENT NO. : 10,306,701 B2
APPLICATION NO. : 15/483078
DATED : May 28, 2019
INVENTOR(S) : Yue He et al.

Page 1 of 1

It is certified that error appears in the above-identified patent and that said Letters Patent is hereby corrected as shown below:

In the Claims

Column 26, Line 53:
In Claim 1, after "device;" delete "if".

Signed and Sealed this
Nineteenth Day of November, 2019

Andrei Iancu
*Director of the United States Patent and Trademark Office*